Oct. 27, 1936. C. A. STICKNEY Re. 20,150

FRIGID UNIT

Original Filed Nov. 4, 1927 2 Sheets-Sheet 1

INVENTOR.

Charles A. Stickney, DECEASED
By: J. F. McCanna, Assignee

BY E. F. Wenderoth

ATTORNEY.

Oct. 27, 1936. C. A. STICKNEY Re. 20,150

FRIGID UNIT

Original Filed Nov. 4, 1927 2 Sheets-Sheet 2

INVENTOR.
Charles A. Stickney, Deceased
By: J. F. McCanna, Assignee
BY E. F. Wenderoth

ATTORNEY.

Reissued Oct. 27, 1936

Re. 20,150

UNITED STATES PATENT OFFICE 20,150

FRIGID UNIT

Charles A. Stickney, deceased, late of Rockford, Ill., by John F. McCanna, assignee, Rockford, Ill., assignor to Elmer H. Schwarz, Englewood, N. J.

Original No. 1,791,850, dated February 10, 1931, Serial No. 230,958, November 4, 1927. Application for reissue October 10, 1932, Serial No. 637,191

24 Claims. (Cl. 62—115)

This invention relates to refrigerating apparatus generally but has special reference to a frigid unit designed for handy installation in the ice compartment of ordinary ice boxes in converting the same from ice to mechanical refrigeration, although, of course, the invention is not limited to application in that way but may be built in by the maker or seller of the refrigerators.

The invention embodies various features which, for purposes of convenience, may be enumerated briefly as follows:

1. The provision of a unit having condensing and expansion chambers provided in hot and cold sections of a two-chamber casing, thus making for extreme compactness and, at the same time, permitting handy installation in the top of a refrigerator cabinet, the ribbed walls of the hot section when the unit is so installed being exposed outside the refrigerator above the same for ideal heat dissipation and the ribbed walls of the cold section being exposed within the refrigerator for heat absorption.

2. The provision in connection with the two-chamber casing, of a compressor built in as a part of a unitary assembly along with the housing of the electric motor furnishing the power for the operation thereof, the over-all dimensions of the unit being reduced practically to a minimum as a result of such novel design and construction.

3. The provision of a compressor of very simple and durable construction as well as miniature proportions, especially well adapted to assembly in the manner contemplated, and one wherein the pistons are thrown outwardly by centrifugal action and forced inwardly by an eccentric anti-friction bearing ring, so that no complicated operating connections are required and the device is smooth and noiseless in operation.

4. The provision in a frigid unit, of means for periodically defrosting the cold section by placing the condensing and expansion chambers in unrestricted communication. A special feature of the invention is to provide a reducing valve arranged to be operated at intervals as the condensed refrigerant collects in the condensing chamber and to provide in connection with this valve means suitably operated by the motor driving the compressor for periodically opening the reducing valve wide open for the defrosting operation. Thus, the unit may be defrosted in a few minutes every two or three hours or more without the serious interruption to refrigeration which would otherwise be necessitated.

5. The provision of a unit of the present character where the motor housing and compressor casing are hermetically sealed with the two-chamber casing, thus eliminating stuffing boxes, etc.

The invention embraces the above and other features as hereinafter described. Referring to the accompanying drawings—

Figure 1:
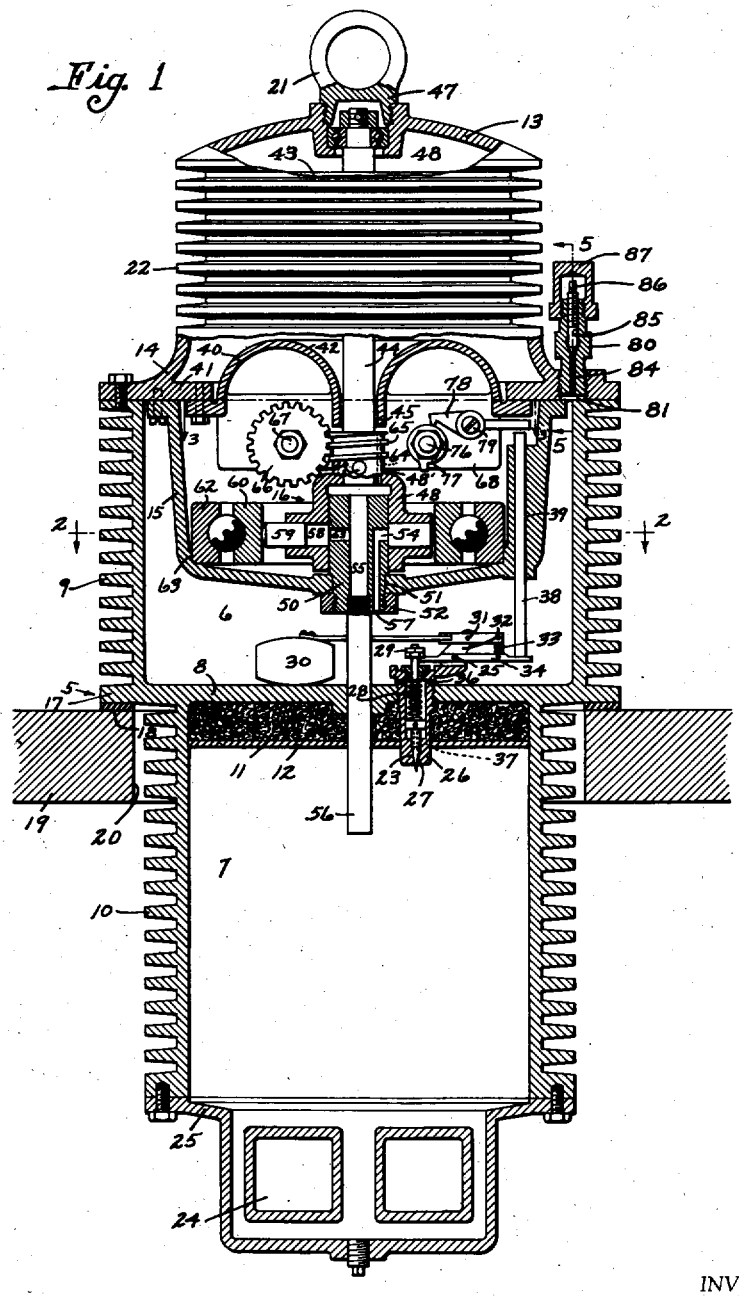
Figure 2:
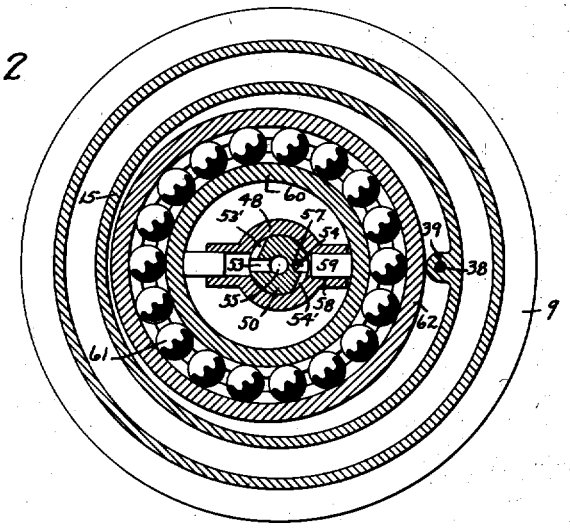
Figure 3:
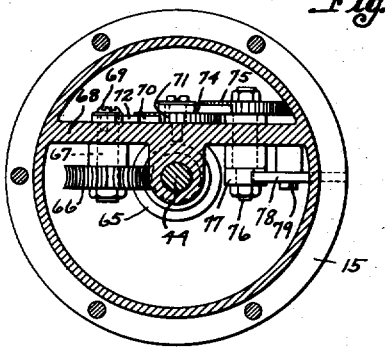
Figure 5:
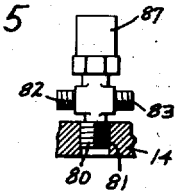
Figure 4:
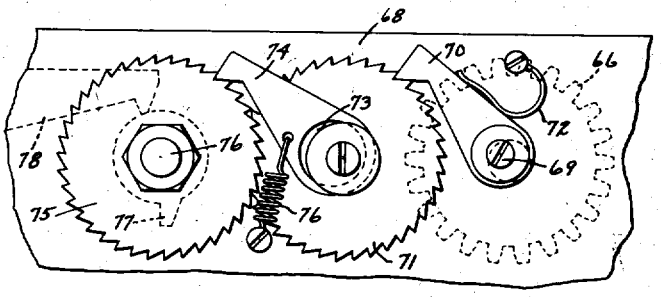

Figure 1 is a central, longitudinal section through the frigid unit of my invention, indicating how the same is arranged to be installed in the wall of a refrigerator cabinet;

Figs. 2 and 3 are horizontal sections taken on the lines 2—2 and 3—3 of Fig. 1;

Fig. 4 is an enlarged detail in elevation of a part of the train of reduction driving connections for the cam which periodically operates the defrosting valve, the other part of the connections and the cam itself appearing in the upper part of Fig. 1; and Fig. 5 is a section through the combination exhausting and filling valve, taken on line 5—5 of Fig. 1.

The same reference numerals are applied to corresponding parts throughout the views.

The frigid unit has the main body portion thereof formed by a two-chamber casing 5 in the form of a unitary casing providing a condensing chamber 6 and an expansion chamber 7 separated by a partition wall 8. While it is preferred to cast the chambers together in a single unit it will be evident that so far as compactness is concerned the same advantages might be gained by casting the two chambers separately and joining them together. The condensing chamber 6 being the heat radiating section may be referred to as the hot section and has ribs 9 on the walls thereof for radiation of the heat therefrom. The expansion chamber 7 being the heat absorbing section may be referred to as the cold section and has ribs 10 on the walls thereof for heat absorption. Manifestly, the one section being hot and the other section cold it becomes important to avoid conduction from one to the other and for this purpose it is preferred to provide insulating material 11, such as felt or the like, held in place by a plate 12 suitably having a press fit inside the cold section. An electric motor 13 has the housing 14 thereof closing the top of the hot section and supports the housing 15 of the compressor 16 within the hot section, thus cutting down the over-all dimensions of the unit and making for the best compactness. By reason of its proportions the unit may be mounted in a refrigerator cabinet in the manner indicated in Fig. 1 where the flange 17, cast integral with the casing 5 in the vicinity of the partition wall 8 therein, is shown resting on a gasket 18 on the top wall 19 of a refrigerator cabinet, the cold section protruding into the cabinet through an opening 20 in the top wall in the manner shown. It is contemplated that the weight of the unit alone will be sufficient to hold it in place. However, screws or bolts may be provided passing through the flange 17 into the top wall of the cabinet if that is desired. The ring 21 at the top of the unit will serve in the setting or removal thereof. When the unit is installed as just described it will be evident that the ribs 9 of the hot section, and the ribs 22 of the motor housing as well, are ideally situated for heat radiation since the heat rises naturally therefrom. In a similar manner the ribs 10 of the cold section are ideally situated for heat absorption, inasmuch as the heat rises naturally thereto. In operation, it may be stated at this point that the compressor 16 supplies compressed gaseous refrigerant, such as sulphur dioxide, to the condensing chamber 6 where the refrigerant is condensed from the compressed gaseous state to liquid form, the heat being dissipated to the atmosphere by radiation from the ribs 9. The liquid refrigerant is then allowed to evaporate in the expansion chamber 7 upon passage to this low pressure area past a reducing valve 23 from the high pressure area of the condensing chamber, the heat required for the evaporation being abstracted from within the refrigerator cabinet by absorption through the ribs 10. The cycle is, of course, familiar to those skilled in the art. In passing, attention may be called to the storage compartments 24 formed in a closure 25 provided for the lower end of the casing to close the cold section. The compartments 24 serve the usual purpose of freezers as for example in making ice cubes and the like.

The reducing valve 23 is reciprocable in a plug 26 mounted in the partition wall 8 in the manner shown and is normally held to its seat 27 by a coiled compression spring 28. An adjustable tappet nut 29 threading on the upper end of the stem of the valve 23 is arranged to be set accurately at the factory when the unit is assembled and should seldom, if ever, require any resetting. A float 30 has the arm thereof pivoted at 31 on a bracket 32 suitably formed integral with the upper end of the plug 26 and has a link connection at 33 with a rocker arm 34 pivoted at 35 on the bracket 32. The end of the arm 34 engages the under side of the tappet nut 29 and is arranged to lift the valve 23 off its seat against the action of the spring 28 when the float 30 is caused to rise as a result of a collection of condensed refrigerant in the bottom of the condensing chamber. The refrigerant flows into the plug through openings 36 and flows past the end of the valve where the same is fluted, as indicated at 37. Manifestly, the opening of the reducing valve will be very slight for a given movement of the float, the operating connection between the float and the valve afforded by the linkage having a ratio of about 25 to 1. In other words, such a restriction is maintained by the valve 23 that refrigeration will result upon the passage of the liquefied refrigerant from the high pressure area of the condensing chamber to the low pressure area of the expansion chamber. It will also be evident that there will be little danger of clogging of the reducing valve inasmuch as the collection of any dirt or grit in the plug 26 at or around the seat 27 tending to prevent the passage of the liquid refrigerant past the valve will merely result in the collection of more and more liquefied refrigerant in the condensing chamber and consequently will cause a greater and greater opening of the reducing valve until eventually the dirt or grit will be washed through. The reducing valve should, therefore, never require attention inasmuch as its difficulties are automatically remedied.

It is well known how the frost coils of the standard type refrigerators become so heavily frosted that the efficiency is somewhat impaired, and the coating has to be removed with a pick or else the refrigerator has to be turned off long enough to allow the coating to melt off. According to the invention the valve 23, in addition to serving as a reducing valve, is made to function as a defrosting valve for placing the condensing and expansion chamber in unrestricted communication. A push rod 38 slidably received in a hole 39 provided in the housing 15 is arranged, as hereinafter described, to depress the end of the rocker arm 34 to open the valve 23 wide open so that both temperature and pressure may be equalized in the two chambers just long enough for the frost coating on the walls of the expansion chamber to melt off, the water dripping therefrom being drained from the refrigerator in the usual way. As hereinafter described, it is contemplated the provision of means operating the valve to defrost the unit periodically during the normal operation thereof, the unit being defrosted, for example, every two or three hours or more and in that way being made to operate always at its highest efficiency. This method of defrosting as contrasted with the old method where the unit was thrown out of operation, will not consume enough time to seriously interrupt the refrigeration.

The compressor 16, as stated above, has the casing 15 thereof suspended from the housing 14 of the motor 13 within the hot section of the frigid unit. The connection therebetween is airtight in order that the pressure in the condensing chamber 6 may be maintained and in order further that the pint or so of oil stored in the bottom of the casing 15 for the lubrication of the compressor 16 and other parts operating therein will not leak therefrom. A wall 40 fastened to a flange 41 inside the housing 14 serves as a baffle to retain the oil in the casing 15, even though the unit in shipment happens to be laid on its side. The wall 40 is also conformed to provide an annular trough 42 into which the oil will flow in the event the unit happens to be stood upside down. The armature 43 of the motor 13 is, therefore, protected under all circumstances against contamination from oil despite the fact that the shaft 44 thereof passes relatively freely through a center hole 45 in the wall 40 for connection with the compressor 16. The upper end of the shaft 44 is received in an anti-friction bearing 46 in the upper end of the housing 14. The ring 21, previously referred to, is suitably formed as part of a cap 47 threading into the bearing opening in the housing 14 to serve as a hermetic seal, the purpose for which will presently appear.

The compressor 16 comprises a rotary cylinder block 48 fixed to the lower end of the shaft 44 as by means of a pin 49 passed through the hub portion 48 of said block. The latter is mounted for rotation on a post 50 fixed in a center hole 51 in the bottom wall of the casing 15 as by means of a nut 52. The post 50 has a low pressure intake port 53 and a high pressure exhaust port 54. The former communicates through a central passage 55 in the plug 50 with the upper end of a pipe 56 extending downwardly through the partition wall 8 into the expansion chamber 7. The port 54, on the other hand, communicates through a passage 57 with the condensing chamber 6. The supply of gaseous refrigerant for the compressor it will now be clear is supplied through the pipe 56 from the expansion chamber 7 and the liquefied refrigerant produced in the condensing chamber 6 is the result of the condensation of the compressed gas supplied to said chamber through the passage 57. The cylinder block 48 has a plurality of radial cylindrical bores 58 provided therein, only two being shown as a matter of convenience although it is preferred to employ as many as five. The bores 58 have solid pistons 59 received therein with a fairly close fit and arranged to be reciprocated from the intake position shown at the left in Fig. 1 to the exhaust position shown at the right in said figure. On the intake stroke of the pistons the bores 58 are in communication through approximately 45° of their travel by reason of the provisions of a lateral extension 53' of the intake portion 53, as seen in Fig. 2. Similarly the bores are placed in communication with the exhaust port 54 through approximately 45° of their travel when the pistons approach the inner end of their compression strokes by reason of the fact that the exhaust port 54 has a lateral extension 54', as seen in Fig. 2. The pistons have sufficient mass and the speed of rotation is high enough to insure the throwing out of the pistons on the intake stroke under centrifugal force. The pistons have rounded outer ends as shown bearing against the inner periphery of a ring 60 disposed eccentric with the post 50 and cylinder block 48. The ring 60 forms the inner race for an anti-friction bearing having balls 61 disposed between said ring and an outer race ring 62, seated, as indicated at 63, in a recess provided therefor in the bottom of the casing 15. Thus, in the rotation of the cylinder block 48 the pistons 59 are thrown out against the ring 60 under centrifugal force and are moved inwardly on their compression strokes by reason of the eccentric position of the ring. Since the latter forms a part of an anti-friction bearing it will be evident that the operation is smooth and quiet and does not consume very much power. Lubrication of the pistons and cylinder bores of the compressor, as well as the anti-friction bearing referred to is obviously taken care of adequately since these parts operate in an oil bath, as previously indicated. In passing, attention may be called to the fact that the passage 55 extends entirely through the post 50 for communication with the inside of the hub 48' of the cylinder block 48 and that the hub has a hole 64 drilled longitudinally therethrough. Thus, the inside of the compressor casing 15 is always in communication with the expansion chamber. This insures the cooling off of the compressor. The fact that the center hole 45 in the wall 40 is large enough for free passage therethrough of the shaft 44 also results in the inside of the motor housing 14 being sufficiently in communication with the inside of the compressor casing 15 that a certain cooling effect is secured, although, of course, there is practically sufficient cooling of the armature secured as a result of the provision of the ribs 22 previously referred to.

The valve 23, as stated before, is arranged to be operated periodically for the defrosting of the cold section by depression of the push rod 38 during the operation of the compressor. A worm 65 is fixed on or provided as an integral part of the hub 48' of the cylinder block 48 so as to be operated by the motor 13 whenever the compressor 16 is operated, it being, of course, understood that the operation of the frigid unit by the electric motor will be thermostatically controlled to maintain a predetermined desired temperature in the refrigerator cabinet. In other words, the motor 13 will operate only intermittently as determined by the rising and falling of the temperature in said cabinet. The worm 65 meshes with a spur gear 66 fixed on a shaft 67 received in bearings suitably provided on a wall 68 cast integral with the wall 40. The shaft 67 has a screw 69 threaded in the end thereof eccentric to its axis to serve as a crank pin for a pawl 70 operating on a ratchet wheel 71, the pawl being held in engagement with the ratchet suitably by means of a light spring 72. The amount of reduction resulting from the train of connections thus far described will be evident. A still further reduction is secured by the provision of an eccentric 73 on the ratchet wheel 71 for operating a second pawl 74 on a ratchet wheel 75, spring means being provided at 76 to keep the pawl in proper engagement with the ratchet. The latter is arranged to turn a shaft 76 and with it a cam 77 progressively in one direction whenever the motor is operated. The thought is to cause the cam 77 to turn through one complete revolution once in about every two or three hours of operation of the frigid unit, the profile of the cam being such that the valve 23 will be held open for defrosting purposes for a period of a few minutes. The cam is arranged to operate against one end of a rocker arm 78 pivoted at 79 and having the other end thereof arranged to bear down upon the end of the push rod 38. It will be evident that the spring 28 of the valve 23 serves to seat the same immediately upon the release of the push rod 38 when the high point of the cam 77 rides off the end of the rocker arm 78. There is, therefore, no necessity for auxiliary spring means to bring about the return movement of the push rod.

In closing, attention may be called to the combination exhausting and filling valve 80 appearing in Figs. 1 and 5. The latter comprises a T-shaped plug threading into an opening 81 provided in the motor housing 14 and communicating with the inside of the condensing chamber 6. The plug has oppositely directed nipple portions 82 and 83, communicating with the central bore 84 thereof, the one nipple portion being arranged to have connection with an exhausting pump whereby all of the air may be pumped out of the unit, after which the other nipple portion having connection with a reservoir containing $SO_2$ will serve to let in the gas to replace the air. The bore 84 is then sealed by the tight closing of the needle valve 85 by engagement of a key with the square end 86 of said valve and a cap 87 is then threaded on the upper end of the plug to conceal the valve and thus avoid any likelihood of the same being tampered with when the unit is in service.

While the description of the invention has been applied to one specific embodiment it will be apparent that the same is capable of a considerable range of variation from the particular details herein illustrated. It is, therefore, the intention in the appended claims to cover all legitimate modifications and adaptations of the present invention which will, no doubt, suggest themselves to one skilled in the art as a result of the present disclosure.

It is claimed:

1. A device of the character described comprising in a single unit a hot section in the form of a finned cylinder of a certain diameter providing a condensing chamber therein, and a cold section in the form of another finned cylinder contiguous and coaxial with the other cylinder and of a smaller diameter providing an expansion chamber therein, there being an annular shoulder formed at the junction of the two cylinders for supporting said unit on a refrigerator cabinet whereby the hot section is exposed outside the cabinet and the cold section is exposed inside the same, and there being means providing restricted communication between the sections to produce refrigeration in the cold section in the usual way, means for continuously supplying compressed refrigerating medium to the hot section and exhausting expanded refrigerating medium from the cold section, and means whereby the two chambers may be automatically placed in comparatively unrestricted communication whereby to defrost the walls of the expansion chamber.

2. In a device of the character described comprising means providing a condensing chamber, means providing an expansion chamber, and a compressor exhausting into the condensing chamber and having the inlet side thereof communicating with the expansion chamber, a reducing valve affording restricted communication between the two chambers to cause refrigeration in the expansion chamber, and means arranged to be automatically operated to place the two chambers in unrestricted communication whereby to defrost the walls of the expansion chamber.

3. A device as set forth in claim 2 wherein the last mentioned means is arranged to be operated at predetermined intervals.

4. A device as set forth in claim 2 wherein the last means automatically operates said reducing valve to wide open position at predetermined intervals.

5. A device as set forth in claim 2 including means for operating said compressor having a reduction drive connection with the last mentioned means for periodically operating the same at prescribed intervals.

6. In a device of the character described comprising means providing a condensing chamber, means providing an expansion chamber, and means for supplying compressed gaseous refrigerant to the condensing chamber and exhausting expanded refrigerant from the expansion chamber, a reducing valve for affording restricted communication between the two chambers to cause refrigeration in the expansion chamber, a float mechanism in the condensing chamber operatively associated with said valve to open the latter when a certain amount of condensed refrigerant collects in said chamber, and supplemental means arranged to operate said valve by operation of its float mechanism to place the two chambers in unrestricted communication for the purpose contemplated.

7. A device of the character described comprising a casing providing in a single unit a condensing chamber forming a hot section and an expansion chamber forming a cold section, means for mounting said unit in the wall of a refrigerator cabinet so that the condensing chamber is disposed outside the cabinet and the expansion chamber is disposed inside the same, there being a reducing valve affording restricted communication between the two chambers, a compressor having the intake side thereof communicating with the expansion chamber and the exhaust side communicating with the condensing chamber, means for operating said compressor comprising an electric motor having the housing thereof supported on the outer end of said casing and having the casing of the compressor supported thereby within the condensing chamber, the rotor shaft of said motor having a direct driving connection with said compressor, and the compressor casing being arranged to contain a supply of lubricating oil, a baffle wall between the motor housing and the compressor casing having the rotor shaft passing freely through an opening therein, said wall being conformed to provide a pocket for the lubricating oil whereby to exclude the oil from the motor housing in any position in which the device may be placed.

8. A structure as set forth in claim 7 wherein said compressor casing and motor housing are hermetically sealed together, and including means providing communication between the latter and the cold section.

9. In a device of the character described, the combination of a two-chamber casing, one chamber of which constitutes the condensing chamber and the other chamber the expansion chamber of the frigid unit, there being a partition wall between said chambers, said casing having means for supporting the same on the wall of a refrigerator cabinet so that the condensing chamber is exposed outside the cabinet and the expansion chamber projects into the cabinet, an electric motor housing mounted on top of said casing serving to close the condensing chamber, a compressor casing suspended from the motor housing within the condensing chamber, a rotary compressor within said casing, the stator of said compressor comprising a post fixed with respect to the compressor casing and providing a bearing for the rotor of said compressor, an electric motor armature in the electric motor housing disposed vertically and coaxial with said post, said armature having a bearing at its upper end in its motor housing and having at its lower end a direct driving connection with the rotor of said compressor whereby the post serves as a bearing for the lower end of said armature, there being an intake passage for said compressor communicating with the expansion chamber and an exhaust passage for said compressor communicating with the condensing chamber.

10. A structure as set forth in claim 9 wherein the compressor casing and motor housing are hermetically sealed together, and wherein said post has a passageway provided therein establishing communication from the intake passage for the compressor between the expansion chamber and the housing of said motor substantially as and for the purposes described.

11. A structure as set forth in claim 9 including a rod extending through the wall of said compressor casing into the condensing chamber and arranged when moved to operate the reducing valve to wide open position, a gear turning with the motor armature in the operation of the latter, a tappet for communicating endwise movement to said rod and means including reduction gearing driven from said gear arranged periodically in the operation of said armature to operate said tappet.

12. A structure as set forth in claim 9 including a baffle wall separating the compressor casing from the motor housing, there being a supply of lubricating oil in the compressor casing, and said baffle wall having an annular trough provided therein arranged to have the lubricating oil enter the same in certain positions of said unit whereby to exclude the oil from the motor housing.

13. A device as set forth in claim 2 wherein the reducing valve is permanently set for a normal restriction but is movable, while remaining so set from the position of normal restriction to one of less restriction, said reducing valve being arranged to be operated automatically to the latter position by the last mentioned means set forth in claim 2 for the purpose specified.

14. Refrigerating apparatus having a condensing chamber and an expansion chamber normally in restricted communication for refrigerating purposes, and means for automatically placing said chambers in unrestricted communication for defrosting purposes.

15. Refrigerating apparatus having an expansion chamber, a condensing chamber, a compressor supplied with gaseous refrigerant from the expansion chamber and arranged to deliver compressed refrigerant to the condensing chamber for subsequent delivery through a restricted orifice to the expansion chamber, a motor for driving the compressor, and means for periodically subjecting the walls of the expansion chamber to heating whereby to defrost the same, said means having a reduction drive connection with the motor whereby to be rendered operative at predetermined intervals.

16. In a refrigerator comprising means providing a condensing chamber, means providing an expansion chamber, and a compressor exhausting into the condensing chamber and having the inlet thereof communicating with the expansion chamber, a reducing valve normally affording restricted communication between the two chambers whereby to cause refrigeration in the expansion chamber, said reducing valve being constructed for movement from a position of normal restriction to a position establishing open communication between said chambers, whereby to permit defrosting of the walls of the expansion chamber, and means for automatically moving said valve from one position to the other.

17. In the art of producing refrigeration by means of a refrigerating system including an evaporator normally maintained at a frost producing temperature, that step which comprises periodically at intervals utilizing heat generated within the system to raise the temperature of the walls of the evaporator to a frost melting temperature.

18. A refrigerating system comprising a compressor, a condenser and an evaporator, a motor for driving said compressor and means for automatically connecting said condenser and said evaporator at predetermined intervals for the purpose of defrosting said evaporator, said means being driven by said motor.

19. A refrigerating system comprising an evaporator, a compressor and a condenser and means for imparting heat to the walls of the evaporator at frequent intervals, said last named means being responsive to the operation of the motor for driving the compressor.

20. The method of producing refrigeration through the agency of a refrigerating system including an evaporator and means for withdrawing gaseous refrigerant therefrom and for returning liquefied refrigerant to the evaporator which comprises operating the system to maintain the average temperature of the evaporator below 32° F. and also at frequent intervals during each twenty-four hour period to temporarily raise the temperature of the evaporator above 32° F. for a period sufficient to cause a melting of any frost accumulated on said evaporator.

21. The method of producing refrigeration through the agency of a refrigerating system including an evaporator and means for withdrawing gaseous refrigerant from and for returning liquefied refrigerant to the evaporator which comprises operating the system to maintain the temperature of the evaporator normally below 32° F. and also at intervals of less than twenty-four hours to temporarily raise the evaporator temperature above 32° F. for a period sufficient to cause a melting of any frost accumulated on said evaporator.

22. The method of producing refrigeration through the agency of a refrigerating system including an evaporator and means for withdrawing gaseous refrigerant from and for returning liquefied refrigerant to the evaporator which comprises operating the system to produce an evaporator temperature normally below 32° F. and at frequent intervals during each twenty-four hour period to temporarily raise the evaporator temperature above 32° F., the frequency of such intervals being sufficient to prevent the accumulation of any substantial amount of frost on the evaporator.

23. The method of producing refrigeration through the agency of a refrigerating system including an evaporator and means for withdrawing gaseous refrigerant from and for returning liquefied refrigerant to the evaporator which comprises operating the system to maintain the temperature of the evaporator normally below 32° F. and, at intervals of less than twenty-four hours, to temporarily raise the evaporator temperature above 32° F. by utilizing heat from within the system to cause a melting of any frost accumulated on the evaporator.

24. The method of producing refrigeration through the agency of a refrigerating system including an evaporator and means for withdrawing gaseous refrigerant from and for returning liquefied refrigerant to the evaporator which comprises operating the system to maintain the temperature of the evaporator normally below 32° F. and, at frequent intervals during each twenty-four hour period, to temporarily raise the evaporator temperature above 32° F. by utilizing heat from within the system to cause a melting of frost accumulated on the evaporator.

JOHN F. McCANNA,
*Assignee of Charles A. Stickney, Deceased.*